United States Patent
Matthews et al.

(10) Patent No.: US 8,527,120 B2
(45) Date of Patent: Sep. 3, 2013

(54) METHOD AND APPARATUS FOR CONTROLLING A POWERTRAIN SYSTEM INCLUDING AN ENGINE AND ELECTRO-MECHANICAL TRANSMISSION

(75) Inventors: Gregory P. Matthews, West Bloomfield, MI (US); Daniel G. Brennan, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 929 days.

(21) Appl. No.: 12/634,989

(22) Filed: Dec. 10, 2009

(65) Prior Publication Data

US 2011/0144838 A1  Jun. 16, 2011

(51) Int. Cl.
*B60W 10/06* (2006.01)
*F01L 1/34* (2006.01)
*B60K 6/08* (2006.01)
*G06F 17/00* (2006.01)

(52) U.S. Cl.
USPC .......... 701/22; 701/102; 701/105; 123/90.17; 180/65.28; 903/905

(58) Field of Classification Search
USPC ............... 701/22, 70, 99, 101, 102, 108, 1, 701/103, 105; 123/90.15, 90.17, 90.31, 90.11; 180/65.21, 65.22, 65.23, 65.25, 65.26, 65.28, 180/68.285, 219, 65.225, 65.245, 65.285; 903/905, 906, 909
See application file for complete search history.

(56) References Cited

U.S. PATENT DOCUMENTS

| | | | | |
|---|---|---|---|---|
| 5,482,012 A * | 1/1996 | Yoshioka | .................. | 123/90.15 |
| 5,517,955 A * | 5/1996 | Yoshioka | .................. | 123/90.15 |
| 5,676,112 A * | 10/1997 | Bauer et al. | .................. | 123/333 |
| 6,059,059 A * | 5/2000 | Schmidt-Brucken | ...... | 180/65.23 |
| 7,093,568 B2 * | 8/2006 | Yang | .......................... | 123/27 R |
| 2006/0288966 A1 * | 12/2006 | Yang | .......................... | 123/27 R |

* cited by examiner

*Primary Examiner* — Thomas Tarcza
*Assistant Examiner* — Edward Pipala

(57) ABSTRACT

A method for controlling a powertrain includes operating an engine substantially at wide open throttle, monitoring an output torque request, controlling the engine input torque by controlling a valve overlap setting for a cylinder of the engine based upon the output torque request wherein controlling the valve overlap setting for the cylinder modulates a residual burnt gas fraction within the cylinder utilizing at least one of an extended low slope portion of an exhaust valve closing curve and an extended low slope portion of an intake valve opening curve, and controlling an electric machine input torque based upon the output torque request and a time-lag difference between the output torque request and the controlled engine input torque.

19 Claims, 7 Drawing Sheets

METHOD AND APPARATUS FOR CONTROLLING A POWERTRAIN SYSTEM INCLUDING AN ENGINE AND ELECTRO-MECHANICAL TRANSMISSION

TECHNICAL FIELD

This disclosure is related to controlling torque generated by an engine in a hybrid engine and more particularly using cam overlap and throttle to control the torque generated by the engine.

BACKGROUND

The statements in this section merely provide background information related to the present disclosure and may not constitute prior art.

Operating an engine with a partially closed throttle results in undesirable pumping losses. However, an engine operating at substantially wide open throttle results in decreased fuel efficiency and increased emissions due to an increased combustion rate. The increased combustion rate also used provides a torque increase. It is known to control the engine combustion rate and increase fuel efficiency by using residual burned gases to dilute the unburned gas mixture. Dilution exists in the unburned gas mixture because the already burned residual gases reduce the peak burned gas temperature and decrease the combustion rate and resulting engine torque.

It is known, for example, to use a cam phaser to modulate a cam overlap condition between intake and exhaust valves, wherein the valve overlap condition controls the amount of dilution in the unburned gas mixture. When the valve overlap condition is increased, dilution provided by the residual burned gases also increases. However, cam phasers incorporating existing hydraulic systems are responsively slow. The slow response rate of hydraulic system cam phasers creates a time-lag difference between an output torque request provided by an operator's input to an accelerator pedal and the controlled input torque of the engine. In a hybrid transmission an electric machine will provide motor torque, in addition to input torque, for generating an output torque to meet the output torque request. Electric cam phasers are fast enough for transient control, but too expensive. There exists a need for a control system in a hybrid transmission for increasing the time-lag difference between a user output torque request and input torque controlled by cam phasing.

SUMMARY

A powertrain includes an electro-mechanical transmission, an internal combustion engine and an electric machine, the engine providing an engine input torque to the transmission, the electric machine providing an electric machine input torque to the transmission, and the transmission providing an output torque comprising the engine and electric machine input torques. A method for controlling the powertrain includes operating the engine substantially at wide open throttle, monitoring an output torque request, controlling the engine input torque by controlling a valve overlap setting for a cylinder of the engine based upon the output torque request wherein controlling the valve overlap setting for the cylinder modulates a residual burnt gas fraction within the cylinder utilizing at least one of an extended low slope portion of an exhaust valve closing curve and an extended low slope portion of an intake valve opening curve, and controlling the electric machine input torque based upon the output torque request and a time-lag difference between the output torque request and the controlled engine input torque.

BRIEF DESCRIPTION OF THE DRAWINGS

One or more embodiments will now be described, by way of example, with reference to the accompanying drawings, in which.

DETAILED DESCRIPTION

Figure 1:
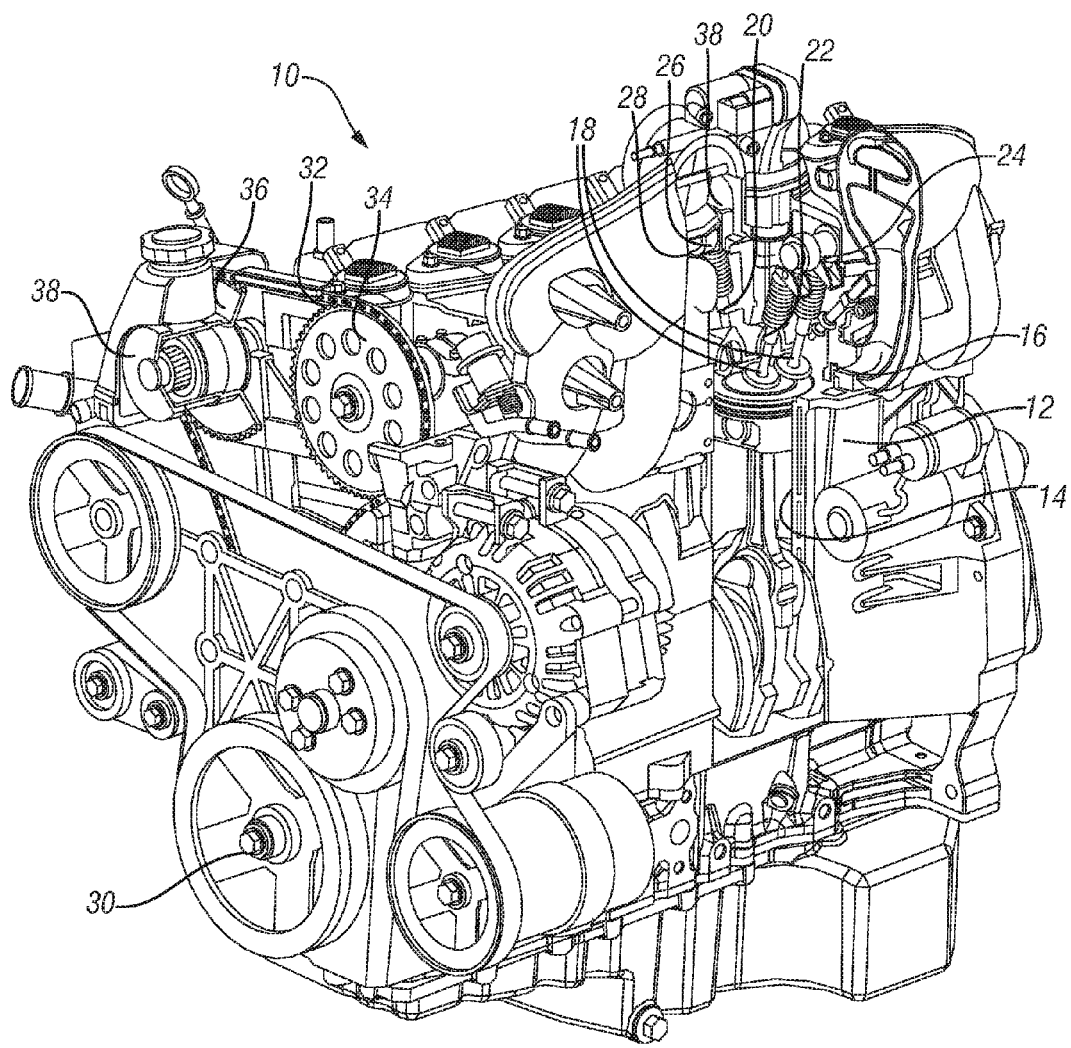
FIG. 1 is a pictorial view of an engine having portions broken away to show internal components pertaining to the present disclosure.

Referring now to the drawings, wherein the showings are for the purpose of illustrating certain exemplary embodiments only and not for the purpose of limiting the same, FIG. 1 illustrates a pictorial view of an engine having portions broken away to show internal components pertaining to the invention. Numeral 10, generally indicates an internal combustion engine having a single cylinder bank 12 with a plurality of cylinders 14. The cylinders are closed by a cylinder head 16 having a plurality of intake valves 18 for admitting intake charges to the cylinders and a plurality of exhaust valves 20 for discharging exhaust gases from the cylinders. The intake valves 18 are actuated by intake cams 22 of an intake camshaft 24. The exhaust valves 20 are actuated by exhaust cams 26 carried by an exhaust camshaft 28.

Both camshafts are rotatably mounted in the cylinder head and are driven by the engine crankshaft 30 through a chain driving intake and exhaust sprockets 34, 36 drivingly connected with the intake and exhaust camshafts 24, 28 respectively. The exhaust sprocket 36 incorporates a cam phaser 38 which is operable to vary the angular position of phase of the exhaust camshaft over a predetermined angular range from its initial position for normal operation.

Figure 2:
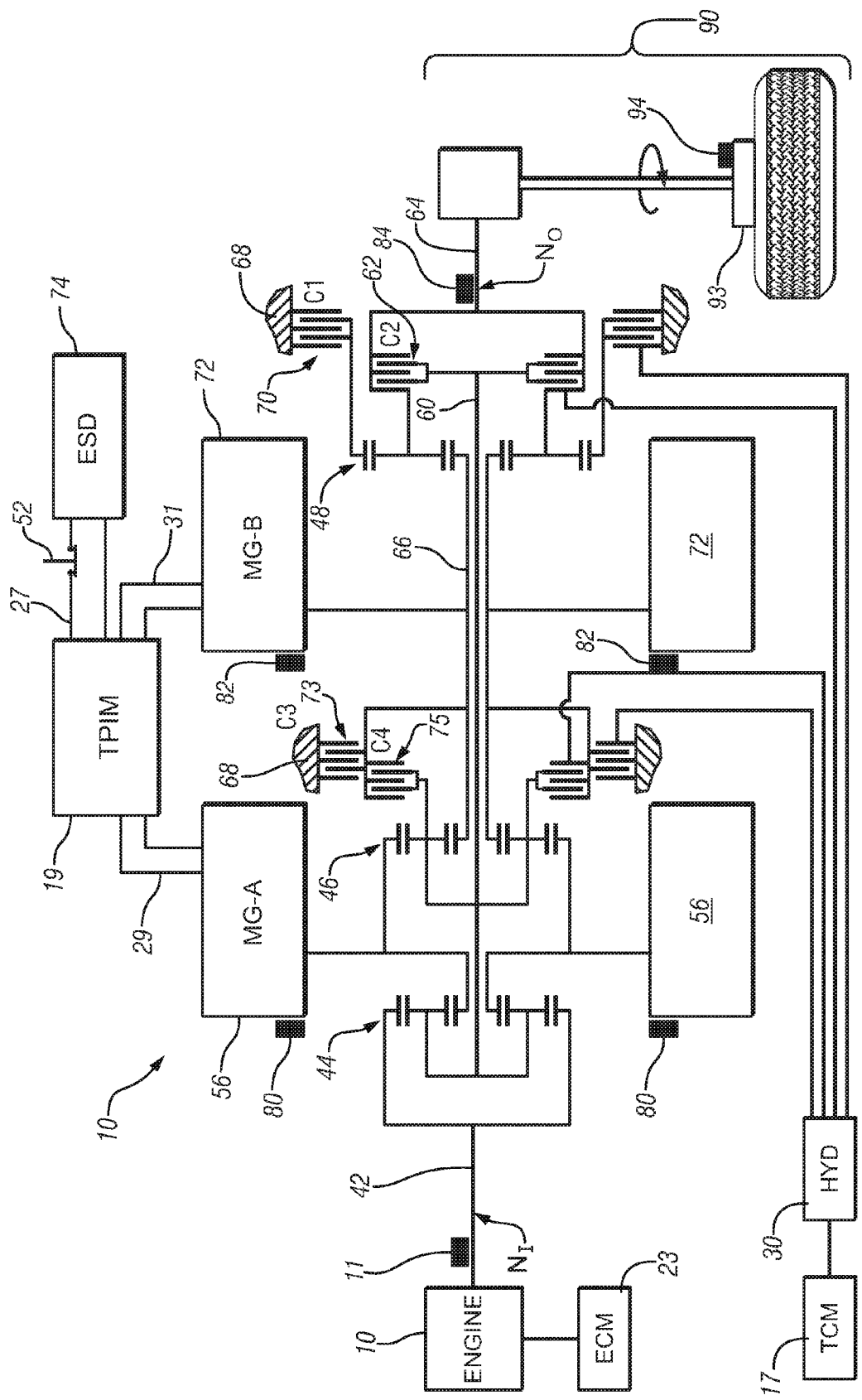
FIG. 2 is a schematic diagram of an exemplary powertrain comprising a two-mode, compound-split, electro-mechanical hybrid transmission operatively connected to an engine and first and second electric machines, in accordance with the present disclosure.
Figure 3:
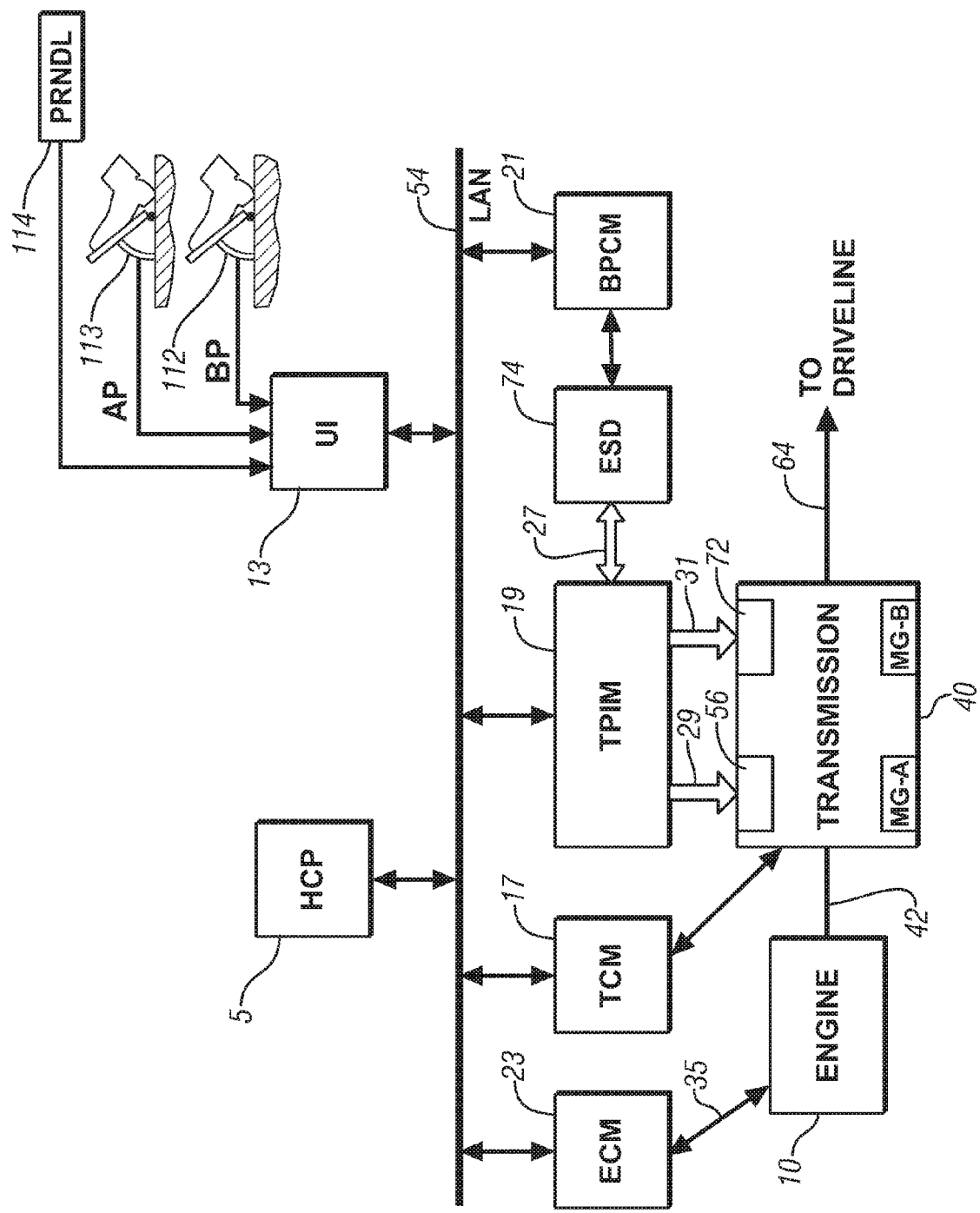
FIG. 3 is a schematic block diagram of a distributed control module system, in accordance with the present disclosure.

Referring to FIGS. 2 and 3 an exemplary electro-mechanical hybrid powertrain is illustrated. The exemplary electro-mechanical hybrid powertrain in accordance with the present disclosure is depicted in FIG. 2, comprising a two-mode, compound-split, electro-mechanical hybrid transmission 40 operatively connected to the engine 10 and first and second electric machines (MG-A) 56 and (MG-B) 72. The engine 10 and first and second electric machines 56 and 72 each generate power which can be transmitted to the transmission 40. The power generated by the engine 10 and the first and second electric machines 56 and 72 and transmitted to the transmission 40 is described in terms of input torques, referred to herein as $T_I$, $T_A$, and $T_B$ respectively, and speed, referred to herein as $N_I$, $N_A$, and $N_B$, respectively.

The exemplary engine 10, as described above, comprises a multi-cylinder internal combustion engine selectively operative in several states to transmit torque to the transmission 40 via an input shaft 42, and can be either a spark-ignition or a compression-ignition engine. The engine 10 includes the crankshaft (not shown) operatively coupled to the input shaft 42 of the transmission 40. A rotational speed sensor 11 monitors rotational speed of the input shaft 42. Power output from the engine 10, comprising rotational speed and output torque, can differ from the input speed, $N_I$, and the input torque, $T_I$, to the transmission 40 due to placement of torque-consuming components on the input shaft 42 between the engine 10 and the transmission 40, e.g., a hydraulic pump (not shown) and/or a torque management device (not shown).

The exemplary transmission 40 comprises three planetary-gear sets 44, 46 and 48, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 50, preferably controlled by a transmission control module (TCM) 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 50.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 46. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 40 includes an output member 64, e.g. a shaft, which is operably connected to a driveline 90 for a vehicle (not shown), to provide output power, e.g., to vehicle wheels 93, one of which is shown in FIG. 2. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input and motor torques from the engine 10 and the first and second electric machines 56 and 72 ($T_I$, $T_A$, and $T_B$ respectively) are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 52. When the contactor switch 52 is closed, under normal operation, electric current can flow between the ESD 74 and the TPIM 19. When the contactor switch 52 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque requests to the first and second electric machines 56 and 72 to achieve the motor torques $T_A$ and $T_B$. Electrical current is transmitted to and from the ESD 74 in accordance with whether the ESD 74 is being charged or discharged.

The TPIM 19 includes the pair of power inverters (not shown) and respective electric machine control modules (not shown) configured to receive the torque requests and control inverter states therefrom for providing motor drive or regeneration functionality to achieve the motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 3 is a schematic block diagram of the distributed control module system. The elements described hereinafter comprise a subset of an overall vehicle control architecture, and provide coordinated system control of the exemplary powertrain described in FIG. 2. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (ECM) 23, the TCM 17, a battery pack control module (BPCM) 21, and the TPIM 19. A hybrid control module (HCP) 5 provides supervisory control and coordination of the ECM 23, the TCM 17, the BPCM 21, and the TPIM 19. A user interface (UI) 13 is operatively connected to a plurality of devices through which a vehicle operator controls or directs operation of the electro-mechanical hybrid powertrain. The devices include an accelerator pedal 113 (AP) from which an operator torque request is determined, an operator brake pedal 112 (BP), a transmission gear selector 114 (PRNDL), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (LAN) bus 54. The LAN bus 54 allows for structured communication of states of operating parameters and actuator command signals between the various control modules. The specific communication protocol utilized is application-specific. The LAN bus 54 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface (SPI) bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the output torque request ($T_{O\_REQ}$), a commanded output torque ($T_{CMD}$) to the driveline 90, an engine 10 input torque request, clutch torques for the torque-transfer clutches C1 70, C2 62, C3 73, C4 75 of the transmission 40; and the torque requests for the first and second electric machines 56 and 72, respectively. The TCM 17 is operatively connected to the hydraulic control circuit 50 and provides various functions including monitoring various pressure sensing devices (not shown) and generating and communicating control signals to various solenoids (not shown) thereby controlling pressure switches and control valves contained within the hydraulic control circuit 50.

The ECM 23 is operatively connected to the engine 10, and functions to acquire data from sensors and control actuators of the engine 14 over a plurality of discrete lines, shown for simplicity as an aggregate bi-directional interface cable 35. The ECM 23 receives the engine input torque request from the HCP 5. The ECM 23 determines the actual engine input torque, $T_I$, provided to the transmission 40 at that point in time based upon monitored engine speed and load, which is communicated to the HCP 5. The ECM 23 monitors input from the rotational speed sensor 11 to determine the engine input speed to the input shaft 42, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 40 and monitors inputs from sensors (not shown) to determine states of transmission operating parameters. The TCM 17 generates and communicates command signals to control the transmission 40, including controlling the hydraulic control circuit 50. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 50 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Control modules may take any suitable form including various combinations of Application Specific Integrated Circuit(s) (ASIC), electronic circuit(s), a central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. A control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators.

Each of the control modules ECM 23, TCM 17, TPIM 19 and BPCM 21 is preferably a general-purpose digital computer comprising a microprocessor or central processing unit, storage mediums comprising read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 54 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

In response to operator input via the accelerator pedal 113 and brake pedal 112 as captured by the user interface 13, the HCP 5 and one or more of the other control modules determine the commanded output torque, $T_{CMD}$, intended to meet the output torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 40 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine, initiated for example within a hybrid strategic control module of the HCP 5, which determines optimum system efficiency based upon operator demand for power, battery state of charge, and energy efficiencies of the engine 10 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 40 required to achieve the desired output torque to meet the operator torque request. As should be apparent from the description above, the ESD 74 and the first and second electric machines 56 and 72 are electrically-operatively coupled for power flow therebetween. Furthermore, the engine 10, the first and second electric machines 56 and 72, and the electro-mechanical transmission 40 are mechanically-operatively coupled to transmit power therebetween to generate a power flow to the output member 64.

As discussed above, managing output torque in order to maintain drivability is a priority in controlling a hybrid powertrain. Any change in torque in response to a change in output torque request applied through the transmission results in a change to the output torque applied to the driveline, thereby resulting in a change in propelling force to the vehicle and a change in vehicle acceleration. The change in torque request can come from operator input, such as pedal position relating an output torque request, automatic control changes in the vehicle, such as cruise control or other control strategy, or engine changes in response to environmental conditions, such as a vehicle experiencing an uphill or downhill grade. By controlling changes to various input torques applied to a transmission within a hybrid powertrain, abrupt changes in vehicle acceleration can be controlled and minimized in order to reduce adverse effects to drivability.

As is known by one having ordinary skill in the art, any control system includes a reaction time or response lag. Changes to a powertrain operating point, comprising the speeds and torques of the various components to the powertrain required to achieve the desired vehicle operation, are driven by changes in control signals. These control signal changes act upon the various components to the powertrain and create reactions in each according to their respective reaction times. Applied to a hybrid powertrain, any change in control signals indicating a new torque request, for instance, as driven by a change in output torque request or as required to execute a transmission shift, creates reactions in each affected torque generating device in order to execute the required changes to respective input torques. Changes to input torque supplied from the engine 10 are controlled by an engine torque request setting the torque generated by the engine 10, as controlled, for example, through the ECM 23. Reaction time within the engine 10 to changes in torque request to the engine 10 is impacted by a number of factors well known in the art, and the particulars of a change to engine operation depend heavily on the particulars of the engine employed and the mode or modes of combustion being utilized. In many circumstances, the reaction time of the engine 10 to changes in torque request will be the longest reaction time of the components to the hybrid drive system. Reaction time within an electric machine to changes in torque request include time to activate any necessary switches, relays, or other controls and time to energize or de-energize the electric machine with the change in applied electrical power.

Figure 4:
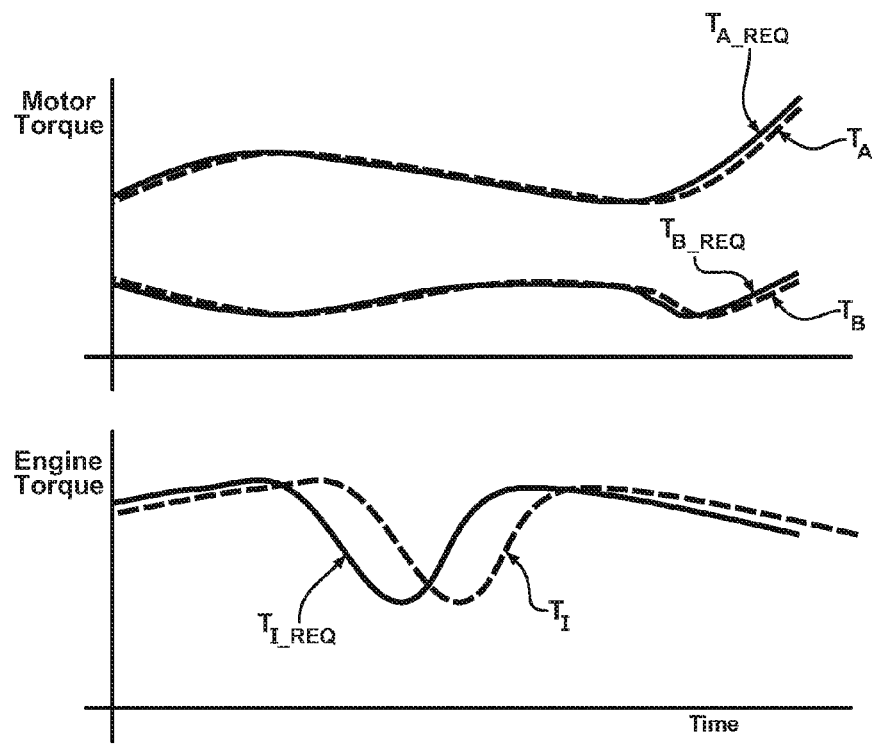
FIG. 4 graphically depicts reaction times of exemplary hybrid powertrain components to changes in torque request, in accordance with the present disclosure.

FIG. 4 graphically depicts reaction times of exemplary hybrid powertrain components to changes in torque request, in accordance with the present disclosure. Components to an exemplary hybrid powertrain system including the engine $T_I$ and the first and second electric machines $T_A$ and $T_B$ are exemplified. Torque requests and resulting changes in input and motor torques produced by each torque generating device are illustrated. As described above, the data shows that electric machines $T_A$ and $T_B$ quickly respond to changes in torque requests, whereas the engine $T_I$ follows changes in torque requests more slowly.

Figure 5:
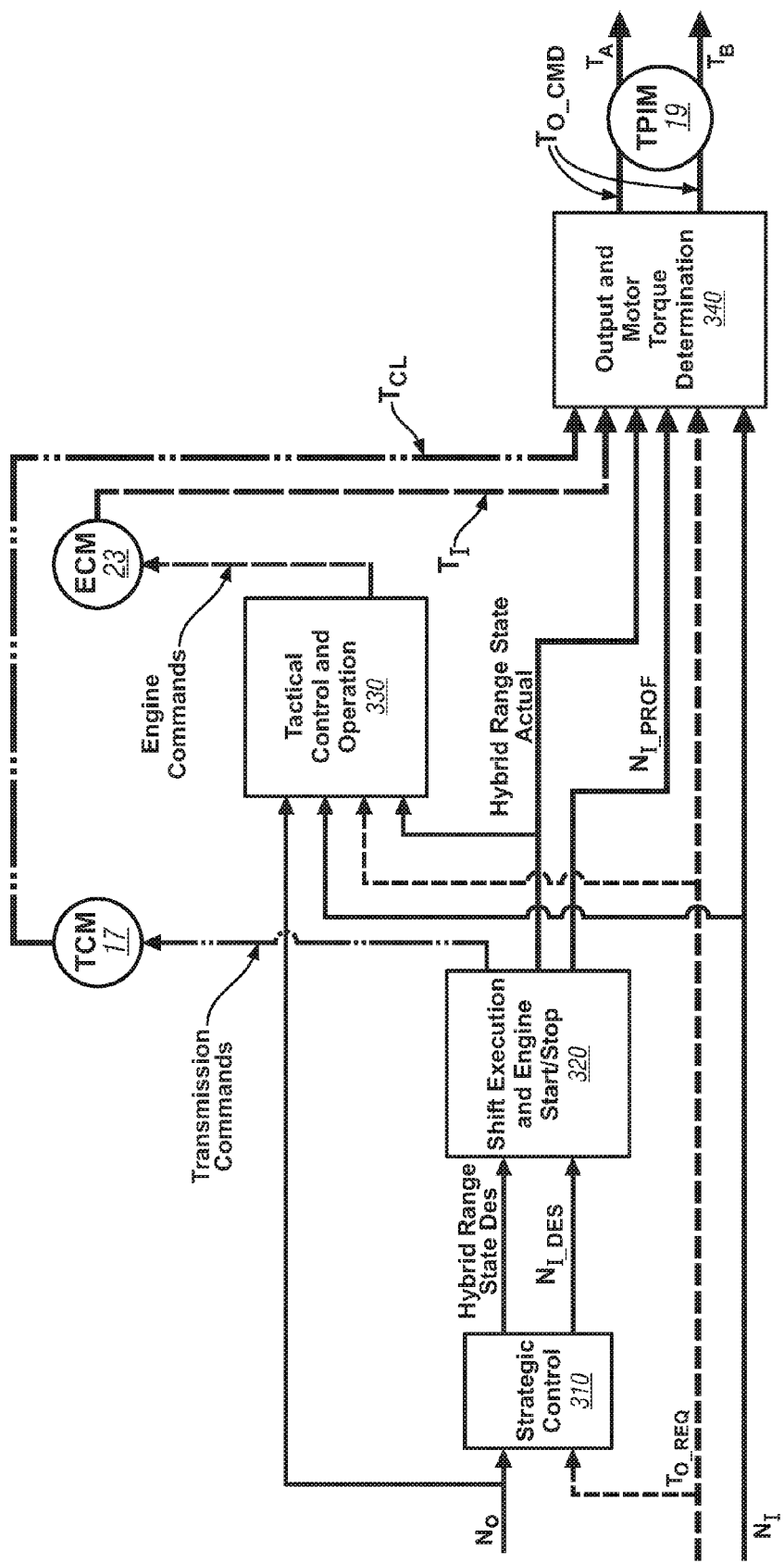
FIG. 5 shows a control system architecture for controlling and managing torque and power flow in a powertrain system having multiple torque generative devices and residing in control modules in the form of executable algorithms and calibrations.

FIG. 5 shows a control system architecture for controlling and managing torque and power flow in a powertrain system having multiple torque generative devices, described hereinbelow with reference to the hybrid powertrain system shown in FIGS. 2 and 3, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 5 depicts a flow of pertinent signals through the control modules. In operation, the operator inputs to the accelerator pedal 113 and the brake pedal 112 are monitored to determine $T_{O\_REQ}$. Operation of the engine 10 and the transmission 40 are monitored to determine the input speed ($N_I$) and the output speed ($N_O$). A strategic optimization control scheme (Strategic Control) 310 determines a preferred input speed ($N_{I\_DES}$) and a preferred engine state and transmission operating range state (Hybrid Range State Des) based upon the output speed and the operator torque request, and optimized based upon other operating parameters of the hybrid powertrain, including battery power limits and response limits of the engine 10, the transmission 40, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme (Shift Execution and Engine Start/Stop) 320 to command changes in the transmission operation (Transmission Commands) including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state (Hybrid Range State Actual) and an input speed profile ($N_{I\_PROF}$) can be determined The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme (Tactical Control and Operation) 330 is repeatedly executed during one of the control loop cycles to determine engine commands (Engine Commands) for operating the engine, including a preferred input torque from the engine 10 to the transmission 40 based upon the output speed, the input speed, and the operator torque request and the present operating range state for the transmission 40. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ($T_{CL}$) for each clutch is estimated in the TCM 17, including the presently applied clutches and the non-applied clutches, and a present engine input torque ($T_I$) reacting with the input member 42 is determined in the ECM 23. A motor torque control scheme (Output and Motor Torque Determination) 340 is executed to determine the preferred output torque from the powertrain ($T_{O\_CMD}$), which includes motor torque commands ($T_A$, $T_B$) for controlling the first and second electric machines 56 and 72 in this embodiment. The preferred output torque is based upon the estimated clutch torque(s) for each of the clutches, the present input torque from the engine 10, the present operating range state, the input speed, the operator torque request, and the input speed profile. The first and second electric machines 56 and 72 are controlled through the TPIM 19 to meet the preferred motor torque commands based upon the preferred output torque. The motor torque control scheme 340 includes algorithmic code which is regularly executed during the 6.25 ms and 12.5 ms loop cycles to determine the preferred motor torque commands.

Figure 6:
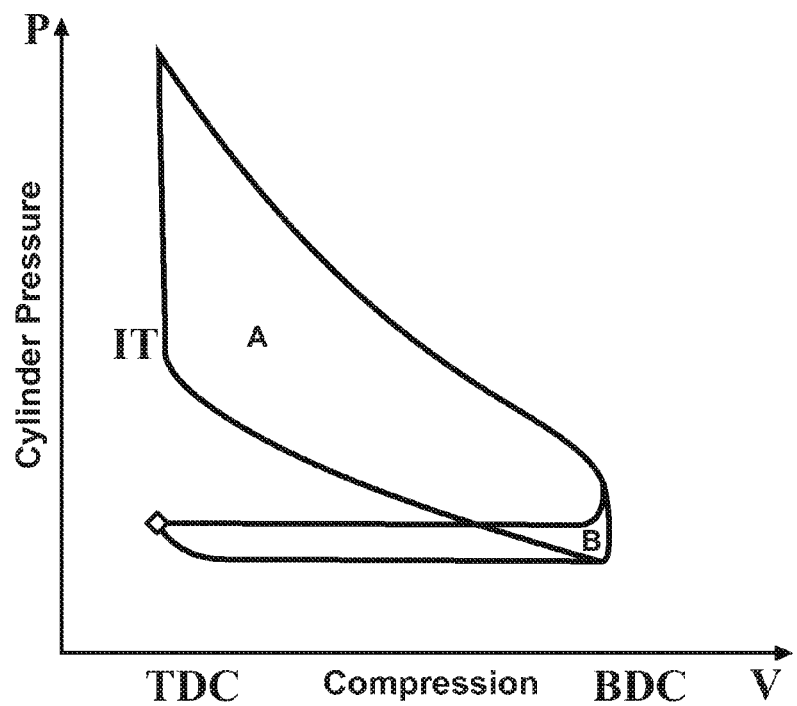
FIG. 6 is a diagram of pressure and volume in a four-stroke cycle engine, in accordance with the present disclosure.

Referring now to FIG. 6, a diagram of a pumping loop as a function of pressure and volume in a four-stroke cycle engine is depicted. Area A plus area B is the work transfer between the piston and the cylinder gases during the inlet and exhaust strokes and is commonly referred in the art as pumping work. The pumping work transfer will be to the cylinder gases if the pressure during the intake stroke is less than the pressure during the exhaust stroke. On the contrary, the pumping work transfer will be from the cylinder gases to the piston if the exhaust stroke pressure is lower than the intake pressure. A throttle partially closed results in a pumping work decrease, referred to in the art as a pumping loss. It is therefore desirable to position the throttle at or near wide open for minimizing pumping losses, thus increasing the intake pressure. As discussed in further detail below, it will become apparent that operating an engine at or near wide open throttle results in increased fuel economy and decreased NOx emissions when the combustion rate is controlled by a cam overlap condition.

The presently described embodiment utilizes burned residual gas and exhaust gas recycle (EGR) for the control of SI engine combustion rate and NOx emissions, wherein a fraction of the exhaust gases are recycled through a control valve from the exhaust to the engine intake system. EGR acts as an additional dilutant in the unburned gas mixture because the EGR is already burned from a previous cycle, thereby reducing the peak burned gas temperatures and NOx formation rates. These burned gases are comprised of both residual gas from the previous cycle and exhaust gas recycled to the intake. The residual gas fraction is influenced by load and valve timing, especially the extent of intake and exhaust valve overlap. Since the residual burned gases and EGR dilute the unburned mixture, the absolute temperature reached after combustion varies inversely with the burned gas mass fraction. Hence increasing the burned gas fraction reduces the combustion rate and the formation of NOx emissions.

Figure 7:
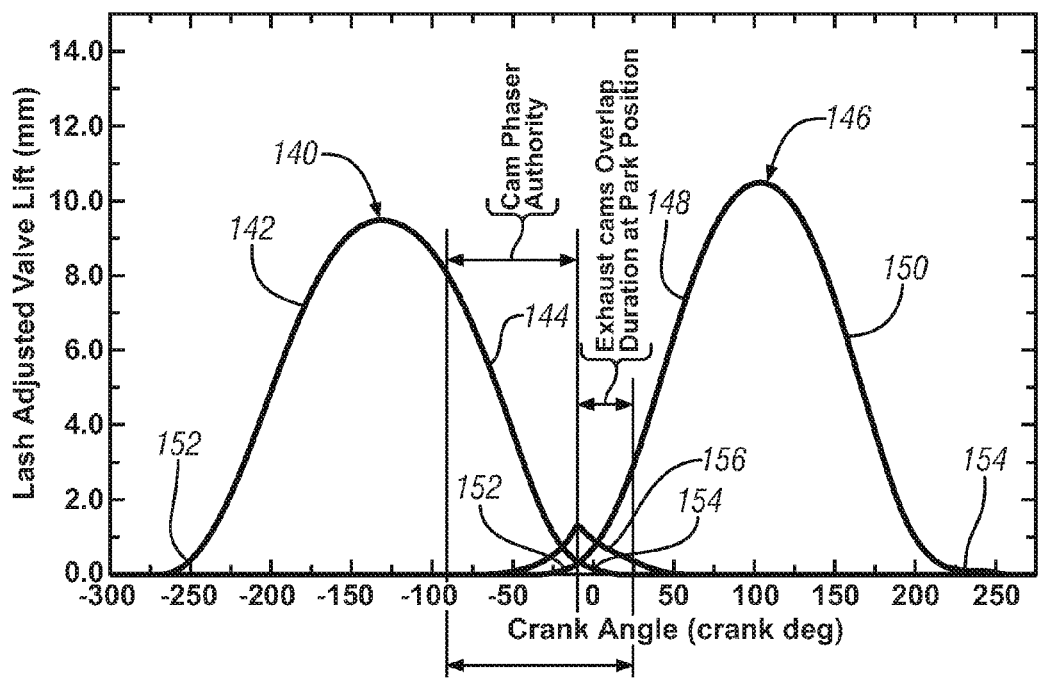
FIG. 7 is a diagram showing the lift curves, or opening and closing curves, for exhaust and intake cams in a conventional timing arrangement, in accordance with the present disclosure.

Referring to FIG. 7, an exemplary cam lift diagram of an engine includes a nominal exhaust valve lift curve 140 with a nominal exhaust valve opening curve 142 and a nominal exhaust valve closing curve 144 on opposite sides of peak lift, and a nominal intake valve lift curve 146 similarly with a nominal intake valve opening curve 148 and a nominal intake valve closing curve 150 on opposite sides of a peak. One having ordinary skill in the art recognizes that the nominal valve lift curves 140, 146 begin and end with relatively low slope acceleration and deceleration portions 152, 154 respectively, which transition to or from relatively high slope opening and closing portions for rapid opening and closing of the valves. One skilled in the art recognizes valve lift curves may be implemented by cam profiles. Alternatively, valve lift curves may be implemented by fully flexible valve actuation mechanisms such as electrically and hydraulically actuated valves.

Figure 8:
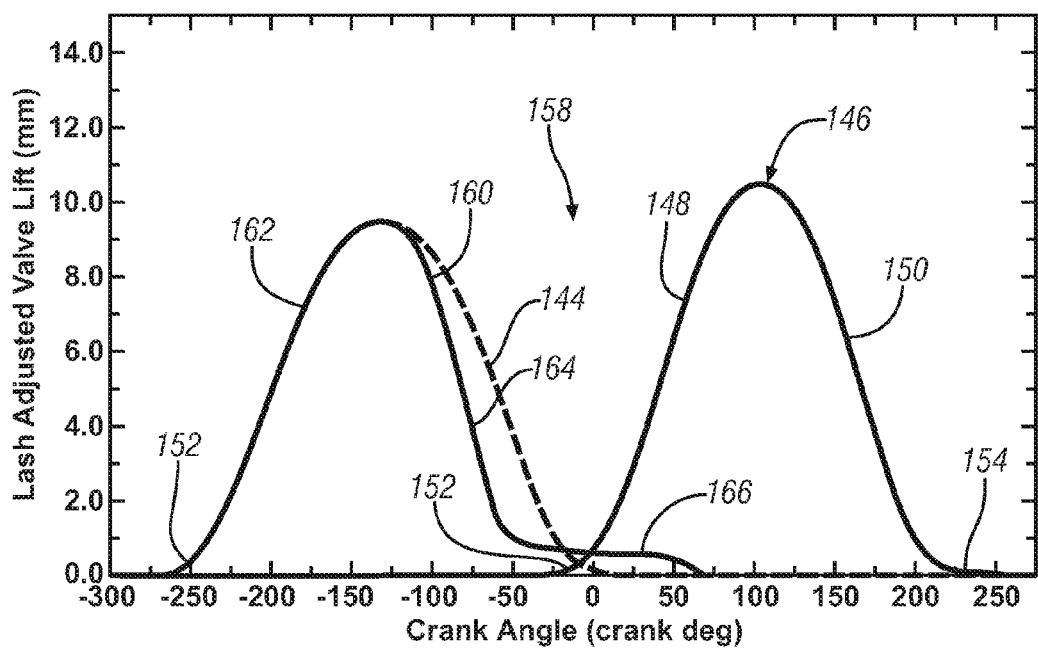
FIG. 8 is a diagram similar to FIG. 7 but showing the lift curves of an engine having an exhaust cam modified in accordance with the invention, in accordance with the present disclosure.
Figure 9:
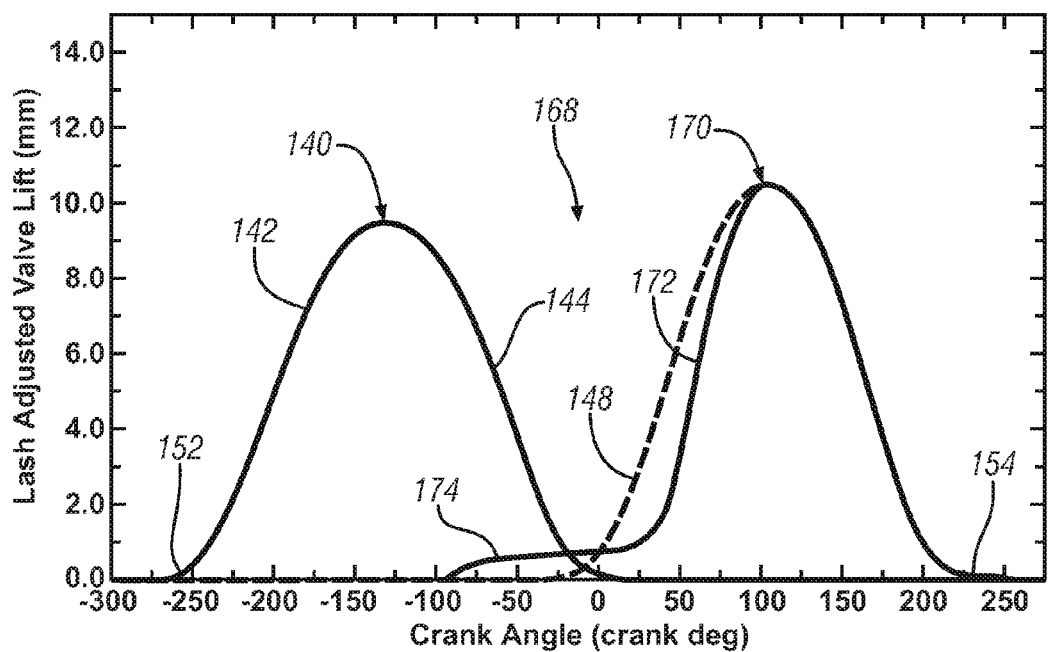
FIG. 9 is a view similar to FIGS. 7 and 8 but showing the lift curves of a camshaft with the inlet cam modified in accordance with the present disclosure.

"Overlap area" as used herein, indicates the cumulative area of overlapping valve lift over the crank angle of the overlap period indicated on a valve timing diagram, as shown for example in FIGS. 7-9 of the drawings. The overlap area may thus be expressed in mm-degrees, describing a cumulative area upon the graphs. "Overlap centerline" indicates a selected point in time when both valves are open an equal amount. As previously discussed, overlap area increases the amount of gas of residual burned gas that is recycled through the engine, wherein the residual burned gas acts as a dilutant to the unburned gas mixture. It will become apparent that increasing the valve overlap results in increasing dilution.

In a nominal fixed timing of inlet and exhaust cams for overall engine operation depicted in FIG. 7, deceleration portion 154 of nominal exhaust valve lift curve 140 overlaps acceleration portion 152 of nominal intake valve lift curve 146 for about 50° of engine crank angle rotation. At the overlap centerline, both valves are open about 0.3 millimeters. The result is a relatively small valve overlap area. Exemplary overlap area 156 is also depicted in FIG. 7, showing an increased overlap based upon retarded exhaust valve timing and advanced intake valve timing.

The cam phaser 38 of the engine 10, shown in FIG. 1, allows the phase angle of the exhaust cams 26 to be retarded up to 80°, for example. It will be seen that increasing the overlap in crank angle degrees will rapidly increase the overlap area for EGR as the intersection of the valve curves rises rapidly due to the high slopes of the intersecting nominal exhaust valve closing curve 144 and nominal intake valve opening curve 148. With a maximum retarding of 80°, the valve overlap area would increase at an increasing rate to an exemplary ten times the initial overlap area. A comparison of the two overlap areas depicted in FIG. 7 shows that a relatively small adjustment to valve timings creates a large percentage increase in overlap area.

The result is that any even minimal retarding of the exhaust cam phase angle results in a rapid increase in EGR which makes it difficult to control EGR with a reasonable degree of accuracy and to accommodate variations between engines without reaching the point in some engines where instability results. Accordingly, calibration of controls involving the phase angle change is preferably conservative in order to avoid combustion instability. This calibration control strategy results in slow reaction times and an inability to provide as much EGR flow as might be desirable under many engine conditions.

Referring now to FIG. 8 of the drawings, numeral 158 represents a modified pair of valve lift curves according to the disclosure to reduce the control problems previously indicated. In FIG. 8, the intake valve lift curve 146 is nominal as in FIG. 7. However, a modified exhaust valve lift curve 160 has an exhaust valve closing curve 164 advanced by a predetermined crank angle, for example advanced by about 50° relative to the nominal exhaust valve closing curve 144. From a valve lift of approximately 1 millimeter, the exhaust valve closing curve 164 levels out into an extended low slope lift portion 166 having a horizontal or low downward slope for a predetermined phase angle duration of, for example, about 75° to 100°, after which the exhaust valve closing curve lift decreases to zero. The approximate 1 millimeter lift of the extended low slope lift portion 166 is merely exemplary and other lifts are envisioned. Because of the horizontal or slightly downward slope of the extended low slope lift portion 166, the changes to the valve overlap area effected by phase angle adjustment of an exhaust cam with a profile implementing such a curve are relatively linearly with respect to the phase angle adjustments. Alternatively, overlap may be effected by phase angle adjustment of the intake cam. Utilizing such an extended low slope lift portion 166 allows for a predictably controllable valve overlap area and resulting residual burnt gas fraction in the next combustion cycle.

Accordingly, the change in EGR flow with the variation in cam phasing becomes a substantially linear function of the change in phase angle as opposed to the substantially exponential function resulting from the nominal lift curves of FIG. 7. In this way, the control of EGR flow is more easily accommodated since sudden changes in the EGR flow are essentially eliminated and a generally linear function is provided.

Referring now to FIG. 9 of the drawings, numeral 168 represents a modified pair of valve lift curves according to the disclosure to reduce the control problems previously indicated. In FIG. 9, the exhaust valve lift curve 140 is nominal as in FIG. 7. However, a modified intake valve lift curve 170 has an intake valve opening curve 172 retarded by a predetermined crank angle, for example retarded by about 50° relative to the nominal intake valve opening curve 148. From a valve lift of approximately 1 millimeter, the intake valve opening curve 172 levels out into an extended low slope lift portion 174 having a horizontal or low upward slope for a predetermined phase angle duration of, for example, about 75° to 100°, after which the opening curve transitions into the relatively high slope opening portion of the intake valve opening curve 172. The approximate 1 millimeter lift of the extended low slope lift portion 174 is merely exemplary and other lifts are envisioned. Because of the horizontal or slightly upward slope of the extended low slope lift portion 174, the changes to the valve overlap area effected by phase angle adjustment of an intake cam with a profile implementing such a curve are relatively linearly with respect to the phase angle adjustments. Alternatively, overlap may be effected by phase angle adjustment of the exhaust cam. Utilizing such an extended low slope lift portion 174 allows for a predictably controllable valve overlap area and resulting residual burnt gas fraction in the next combustion cycle.

Additionally, similar results could be obtained if both the exhaust and intake cams have profiles implementing extended low slope lift portions as described individually above. Either or both intake and exhaust cams could then be phase adjusted to achieve the desired overlap linearly with respect to the phase angle adjustment(s).

As described above, valve overlap can be used to retain a portion of exhaust gases that would normally be expelled from the cylinder, these gases acting as a dilutant in the subsequent combustion cycle. By increasing presence of a dilutant in the combustion chamber, the resulting volume of air-fuel charge in the combustion chamber available to combust is reduced. This combustion of a reduced air-fuel charge results in a reduced work output from the cylinder or a reduced engine input torque $T_I$ available to the transmission.

Figure 10:
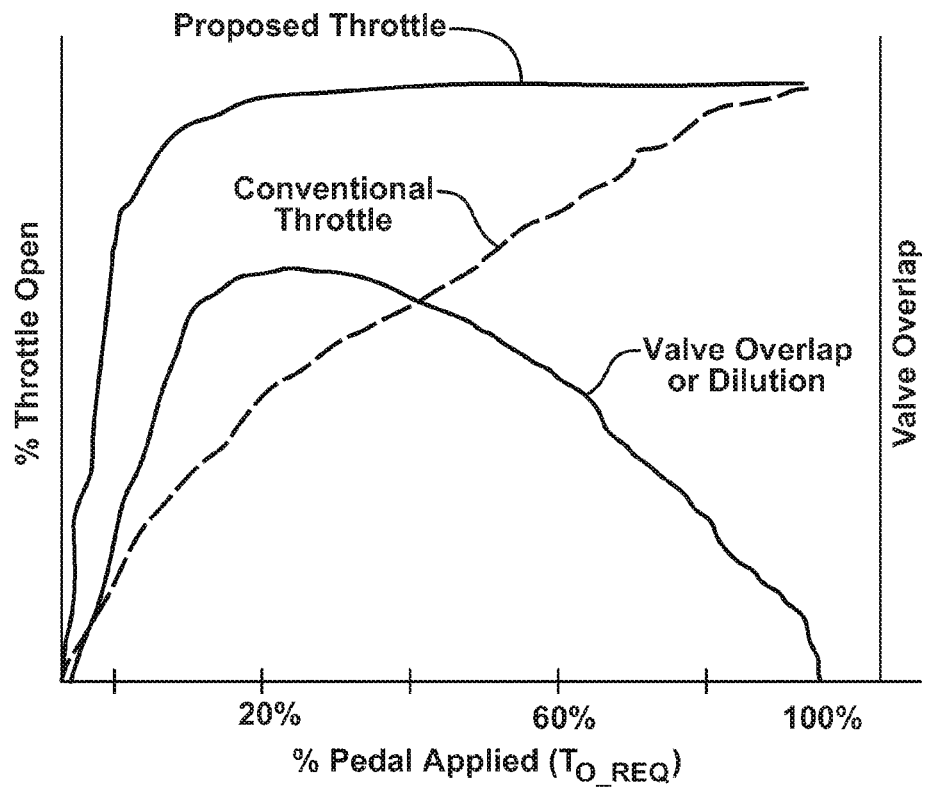
FIG. 10 is a diagram of throttle opening and valve overlap as a function of pedal.

In accordance with the presently described embodiments, FIG. 10 depicts a method to utilize a substantially wide open throttle, thereby reducing pumping losses in the cylinder, while controlling input torque by modulating residual burnt gas fraction in the cylinder. The diagram depicts throttle opening (% Throttle Open) and valve overlap (Valve Overlap) as a function of applied accelerator pedal (% Pedal Applied ($T_{O\_REQ}$)). As described above, the accelerator pedal can be monitored to determine an output torque request $T_{O\_REQ}$. As shown by the dashed line representing a conventional throttle method, as the output torque request increases, the throttle opens at a rate substantially proportional to $T_{O\_REQ}$. Under the conventional throttle method, the engine is not operating at substantially wide open throttle until the operator input to the accelerator pedal reaches substantially 100%. As describe above, undesirable pumping losses occur when a throttle is partially closed. Pumping losses result in decreased pumping work transfer, wherein pressure during the intake stroke is less than the pressure during the exhaust stroke. It will be appreciated that a partially closed throttle additionally creates instability in the combustion rate of the diluted unburned gas mixture. This instability results from the residual burnt gas fraction interacting with intake air at varying pressures within the intake manifold resulting from the pumping losses. However, in order to maintain $T_I$ according to $T_{O\_REQ}$, the throttle must be partially closed in order to control the air fuel charge in the combustion chamber according to the desired combustion output.

FIG. 10 additionally depicts a proposed throttle method in accordance with the disclosure wherein residual burnt gas fraction is modulated to control $T_I$ according to $T_{O\_REQ}$. According to the proposed throttle method, as $T_{O\_REQ}$ is increased from zero, throttle position rises rapidly and quickly achieves a wide open position. In exemplary operation, the throttle can be said to be at substantially wide open throttle if the output torque request exceeds a minimum output torque request. FIG. 10 shows a wide open throttle is achieved at about a 20% pedal position. As a result, pumping losses are significantly reduced in the cylinder as compared to operation under the conventional throttle method. Under the proposed throttle method, valve overlap or dilution due to residual burnt gas fraction is depicted. As described above, residual burnt gas fraction in the combustion chamber dilutes the air fuel charge and reduces the resulting $T_I$ from the engine. The proposed throttle method is used in combination with valve overlap to compensate for the difference between the throttle profile in the conventional throttle method and the throttle profile in the proposed throttle method in order to maintain the $T_I$ to $T_{O\_REQ}$.

The required valve overlap to correctly compensate $T_I$ according to $T_{O\_REQ}$ can be determined through a number of methods. An engine configuration can be calibrated through testing, determining differences in $T_I$ for various throttle settings and determining the effects of various valve overlap settings at the different throttle settings to $T_I$. In the alternative, the effect of throttle setting and valve overlap settings can be predictively modeled by any system sufficient to predict engine operation. Such calibrated results can be stored for on-board use, for example, in a look-up table using throttle position (i.e. $T_{O\_REQ}$) as an independent look-up variable. Alternatively, such results can be applied to functional relationships for various engine conditions, and these functional relationships can be utilized on-board to control throttle and valve settings. In the alternative, a predictive model sufficient to predict engine operation can be utilized on-board to determined control settings. Such an on-board model can be preprogrammed according to predicted engine operation. Additionally, such on-board models can utilize machine learning algorithms or fuzzy logic methods known in the art to adaptively control the engine settings according to observed behavior in the particular vehicle.

The above exemplary method can be utilized to operate a throttle at substantially wide open throttle while controlling $T_I$ according to $T_{O\_REQ}$. However, as described in FIG. 4 above, engine response times, changing $T_I$ according to changes in $T_{O\_REQ}$, are relatively slow. Slow response times in $T_O$ decrease drivability, decreasing operator satisfaction with vehicle performance. For example, upon a rapid depression of the accelerator pedal, the operator expects to experience a rapid increase in $T_O$. In another example, in anticipation of a stop, the accelerator pedal can be returned quickly to a zero position. In a zero throttle position, the operator expects the vehicle to quickly settle to an unpowered or idle coast. Changes to valve overlap in order to affect changes to $T_I$ in accordance with step changes to $T_{O\_REQ}$ take time to correctly adapt to the step changes to $T_{O\_REQ}$. However, as described above in accordance with FIG. 5, a hybrid drive transmission may cooperatively accommodate a $T_{O\_REQ}$ through control of $T_I$ and a motor torque or torques. In the exemplary configuration of FIG. 5, tactical control and operation module 330 controls engine commands to the ECM 23 in order to effect changes to $T_I$. Resulting $T_I$ is then used by output and motor torque determination module 340, along with $T_{O\_REQ}$ to command motor torques $T_A$ and $T_B$, affecting the motor torques in order to correct any differences between $T_I$ and $T_{O\_REQ}$.

The exemplary method utilizes valve overlap, controlling residual burnt gas fraction, to control $T_I$ according to $T_{O\_REQ}$, and utilizes an electric machine to adjust $T_O$ through transitions in $T_I$. The relatively rapid torque response of the electric machines are thus utilized to compensate for the relatively slow torque response of the engine occasioned by the use of valve overlap to control $T_I$. Thus, any lag in torque response of the engine is compensated by the electric machine torque. By monitoring $T_I$ and $T_{O\_REQ}$, motor torque can be controlled according to feedback and feed forward methods known in the art in order to preserve drivability and reduce the impact of slow engine reaction times to changes in $T_{O\_REQ}$.

The method and system are described hereinabove with reference to an embodiment including the engine 10 and a pair of electric machines 56, 72. Alternatively, the system can be used with other electro-mechanical transmission systems shown in FIGS. 2 and 3 which have more or fewer than two electric machines. Alternatively, the system can be used with other hybrid transmission systems (not shown) which utilize torque-generative machines and energy storage systems e.g., hydraulic-mechanical hybrid transmissions, hydrogen fuel cell applications, etc.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a powertrain comprising an electro-mechanical transmission, an internal combustion engine and an electric machine, the engine providing an engine input torque to the transmission and the electric machine providing an electric machine input torque to the transmission, the transmission providing an output torque comprising the engine and electric machine input torques, the method comprising:
    operating the engine substantially at wide open throttle;
    monitoring an output torque request;
    controlling the engine input torque employing an engine control module by controlling a valve overlap setting for a cylinder of the engine based upon the output torque request wherein controlling the valve overlap setting for the cylinder modulates a residual burnt gas fraction within the cylinder utilizing at least one of
        a modified exhaust valve lift curve that decelerates at a first deceleration rate from a peak exhaust opening to a predetermined exhaust valve opening and then decelerates at a second deceleration rate from the predetermined exhaust valve opening in accordance with an extended low slope lift portion of the modified exhaust valve lift curve for a predetermined exhaust valve closing phase angle duration, wherein a magnitude of the second deceleration rate is less than a magnitude of the first deceleration rate, and
        a modified intake valve lift curve that accelerates at a first acceleration rate from a predetermined intake valve opening in accordance with an extended low slope portion of the modified intake valve lift curve for a predetermined intake valve opening phase angle duration and then accelerates at a second acceleration rate after the predetermined intake valve opening phase angle duration, wherein a magnitude of the first acceleration rate is less than a magnitude of the second acceleration rate; and
    controlling the electric machine input torque based upon the output torque request and a time-lag difference between the output torque request and the controlled engine input torque.

2. The method of claim 1, wherein the predetermined exhaust valve opening and the predetermined intake valve opening comprise a valve lift of less than 1 mm and the predetermined exhaust valve closing phase angle duration and the predetermined intake valve opening phase angle comprise a crank angle duration between about 75 degrees and 100 degrees.

3. The method of claim 1, wherein the valve overlap setting is determined from a look-up table.

4. The method of claim 1, wherein the valve overlap setting is determined from a programmed functional relationship of the output torque request, the engine input torque, and the residual burnt gas fraction.

5. The method of claim 1, wherein controlling the electric machine torque comprises feedback control.

6. The method of claim 1, wherein controlling the electric machine torque comprises feed forward control.

7. The method of claim 1, wherein operating said engine substantially at wide open throttle comprises operating said engine substantially at wide open throttle when the monitored output torque request exceeds a minimum output torque request.

8. The method of claim 1, wherein monitoring the output torque request comprises monitoring an accelerator pedal position.

9. The method of claim 1, wherein the modulated residual burnt gas fraction creates a dilutent to a subsequent unburned gas mixture in the cylinder.

10. The method of claim 1 wherein the powertrain further comprises a plurality of electric machines and controlling the electric machine input torque comprises controlling electric machine input torques of said plurality of electric machines.

11. Method for controlling a powertrain comprising an electro-mechanical transmission, an internal combustion engine and an electric machine, the engine providing an engine input torque to the transmission and the electric machine providing an electric machine input torque to the transmission, the transmission providing an output torque comprising the engine and electric machine input torques, the method comprising:
   operating the engine substantially at wide open throttle;
   monitoring an output torque request;
   transitioning the engine input torque employing an engine control module in response to the monitored output torque request by diluting an air fuel charge within a cylinder of the engine through controlling a valve overlap of an exhaust valve and an intake valve of the cylinder, the valve overlap provided by at least one of
      a modified exhaust valve lift curve that decelerates at a first deceleration rate from a peak exhaust opening to a predetermined exhaust valve opening and then decelerates at a second deceleration rate from the predetermined exhaust valve opening in accordance with an extended low slope lift portion of the modified exhaust valve lift curve for a predetermined exhaust valve closing phase angle duration, wherein a magnitude of the second deceleration rate is less than a magnitude of the first deceleration rate, and
      a modified intake valve lift curve that accelerates at a first acceleration rate from a predetermined intake valve opening in accordance with an extended low slope portion of the modified intake valve lift curve for a predetermined intake valve opening phase angle duration and then accelerates at a second acceleration rate after the predetermined intake valve opening phase angle duration, wherein a magnitude of the first acceleration rate is less than a magnitude of the second acceleration rate; and
   during transitioning the engine input torque, controlling the electric machine input torque in response to the output torque request and the engine input torque.

12. The method of claim 11, wherein the extended low slope portion of the exhaust valve closing curve overlaps an intake valve opening curve.

13. The method of claim 11, wherein the extended low slope portion of the intake valve opening curve overlaps an exhaust valve closing curve.

14. The method of claim 12, wherein the intake valve opening curve comprises the extended low slope portion of the intake valve opening curve.

15. The method of claim 11, wherein the predetermined exhaust valve opening and the predetermined intake valve opening comprises a valve lift of less than 1 mm and the predetermined exhaust valve closing phase angle duration and the predetermined intake valve opening phase angle comprise a crank angle duration between about 75 degrees and 100 degrees.

16. The method of claim 11, wherein controlling the electric machine input torque compensates for a difference between the output torque request and the engine input torque.

17. A powertrain system, comprising:
   an electro-mechanical transmission;
   an internal combustion engine providing an engine input torque to the transmission, said engine comprising a throttle device, a combustion chamber, an exhaust valve, an intake valve, an exhaust cam, an intake cam, an exhaust cam phaser adjusting the timing of the exhaust cam, and an intake cam phaser adjusting the timing of the intake cam;
   an electric machine providing an electric machine input torque to the transmission;
   the transmission providing an output torque comprising the engine and electric machine input torques; and
   a control module
      operating the throttle device at a substantially wide open position,
      monitoring an output torque request,
      controlling the engine input torque through controlling charge dilution in the combustion chamber by a valve overlap setting, the valve overlap setting provided by at least one of
         the exhaust cam phaser that controls a modified exhaust valve lift curve that decelerates at a first deceleration rate from a peak exhaust opening to a predetermined exhaust valve opening and then decelerates at a second deceleration rate from the predetermined exhaust valve opening in accordance with an extended low slope lift portion of the modified exhaust valve lift curve for a predetermined exhaust valve closing phase angle duration, wherein a magnitude of the second deceleration rate is less than a magnitude of the first deceleration rate, and
         the intake cam phaser that controls a modified intake valve lift curve that accelerates at a first acceleration rate from a predetermined intake valve opening in accordance with an extended low slope portion of the modified intake valve lift curve for a predetermined intake valve opening phase angle duration and then accelerates at a second acceleration rate after the predetermined intake valve opening phase angle duration, wherein a magnitude of the first acceleration rate is less than a magnitude of the second acceleration rate, and
      controlling the electric machine input torque based upon the output torque request and a time-lag difference between the output torque request and the engine input torque.

18. The powertrain system of claim 17, further comprising a plurality of electric machines.

19. The method of claim 17, wherein the predetermined exhaust valve opening and the predetermined intake valve opening comprise a valve lift of less than 1 mm and the predetermined exhaust valve closing phase angle duration and the predetermined intake valve opening phase angle comprise a crank angle duration between about 75 degrees and 100 degrees.

* * * * *